Sept. 20, 1938. H. J. BRANDENBURG Re. 20,861

TRANSVERSE FRUIT BRUSHER

Original Filed June 1, 1935

INVENTOR
HARRY J. BRANDENBURG
BY
ATTORNEY

Reissued Sept. 20, 1938

Re. 20,861

UNITED STATES PATENT OFFICE 20,861

TRANSVERSE FRUIT BRUSHER

Harry J. Brandenburg, Glendora, Calif., assignor of sixty-five percent to F. E. Wood, W. G. Carter, J. B. Seem, and W. J. Bailey, all of Monrovia, Calif.

Original No. 2,035,587, dated March 31, 1936, Serial No. 24,536, June 1, 1935. Application for reissue February 18, 1938, Serial No. 191,279

12 Claims. (Cl. 146—202)

My invention relates to the preparation of fruits and vegetables for market and has particular reference to a machine for washing or otherwise treating citrus fruits and the like.

In the citrus industry, the oranges, lemons, etc., are thoroughly washed before being packed for shipment. This is usually done by soaking the fruit in tanks containing cleansing solution and then feeding the fruit to a suitable machine in which the fruit is brushed to remove the surface impurities loosened during the soaking process. The machine most commonly used for washing citrus fruits is known as the "transverse brusher." This machine consists of a frame in which a plurality of transverse, cylindrical brushes are journalled in juxtaposition, these being rotated at a relatively high speed in a common direction. Fruit is fed onto the uppermost surfaces of the brushes at one end of the machine and tends to remain in the valleys formed between the cylindrical brushes. The fruit passes through the brusher by being crowded from one valley into the next by oncoming fruit. When the feeding of additional fruit to the brusher is stopped, the aforementioned valleys remain full of fruit which must be removed or "cleaned out" before brushing another lot of fruit. The cleaning out operation is either accomplished manually or by some form of mechanical clean-out means provided on the washer. A common type of mechanical clean out for use on a transverse brusher is comprised of a plurality of fruit impellers carried along above the brushes by endless chains at either side of the machine. This type of clean out is apt to injure the fruit when coming in contact therewith and also retards the progress of fruit through the brusher when the supply of fruit exceeds the capacity of the brusher.

An object of my invention is to provide a brusher of the transverse brush type that will automatically clean itself out after washing a given lot of fruit.

Another object of the present invention is the provision of a brusher of the transverse brush type in which the fruit will progress from valley to valley without the necessity of being crowded along by oncoming fruit.

A further object is to provide a transverse brush washer through which the fruit will be fed or cleaned out without the necessity of providing mechanical means to engage and urge the fruit therethrough.

Other objects and advantages will be made manifest in the following description taken in connection with the accompanying drawing, in which.

Figure 1:
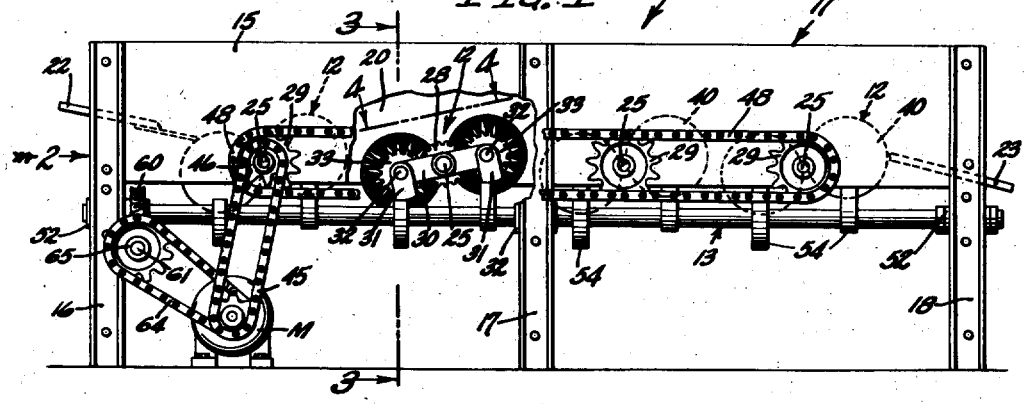
Fig. 1 is a side elevational view of a preferred embodiment of my invention, a portion thereof being broken away to more clearly disclose the structure thereof.

Referring specifically to the drawing, a fruit brusher 10 comprising a preferred embodiment of my invention is shown in Fig. 1, this brusher including a frame 11, a plurality of rockable fruit brushing units 12, and a mechanism 13 for rocking the units 12.

Figure 2:
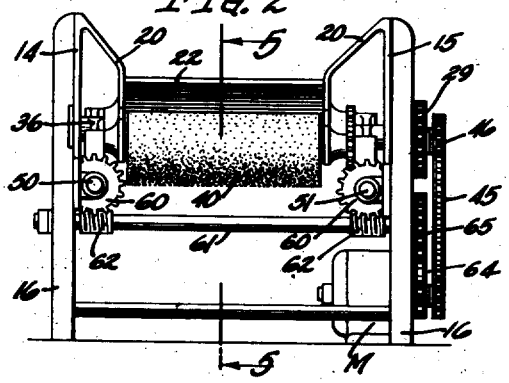
Fig. 2 is an end elevational view looking in the direction of the arrow 2 of Fig. 1.
Figure 5:
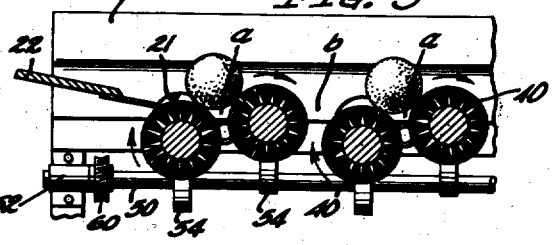
Figs. 5 and 6 are fragmentary, vertical sectional views taken on the line 5—5 of Fig. 2, and illustrating the operation of my invention.

The frame 11 includes a pair of spaced side plates 14 and 15 supported from the floor by pairs of channel iron legs 16, 17 and 18. Fixed on the inside of the plates 14 and 15 are aprons 20, as shown in Fig. 2, having semi-circular notches 21 provided on the lower edges thereof as seen in Fig. 5. Mounted between the aprons 20 at opposite ends of the frame 11 are inlet and outlet drop boards 22 and 23 shown in Fig. 1.

Figure 4:
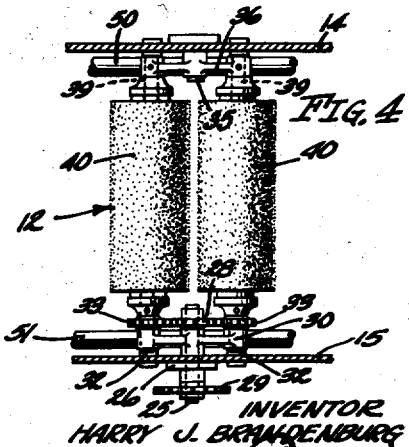
Fig. 4 is a fragmentary sectional view taken on the line 4—4 of Fig. 1.

The brushing units 12 each include a driven shaft 25 journalled in a bearing 26 on a plate 15 as shown in Fig. 4. Fixed on the ends of the shaft 25 is a gear 28 and a sprocket 29. Rockably mounted on the shaft 25 between the gear 28 and plate 15 is a bar 30 having lugs 31 on the under side thereof as seen in Fig. 1. Rotatably mounted in suitable apertures provided in the extremities of the bar 30 are shafts 32 having gears 33 fixed thereon. Fixed on the plate 14 in alignment with each of the shafts 25 is a stud 35 upon which a bar 36 is rockably mounted, the bars 36 being identical with the bars 30 and having lugs 37 formed on the under sides thereof. Fixed in the extremities of the bars 36 are studs 38, the latter being disposed in alignment with the shafts 32 of the arms 30. Mounted on the studs 38 and shafts 32 are rotary brushes 40 driven in a common direction of rotation by the shafts 32. Formed by the uppermost sides of the brushes 40 of each of the units 12 are transverse depressions hereinafter referred to as primary valleys *a* and formed between the inside brushes 40 of adjacent units 12 are similar depressions hereinafter referred to as secondary valleys *b*.

The first of the brushing units 12 is driven from a motor M by a chain 45 trained about a sprocket 46 provided on the shaft 25 of said first unit 12. The other units 12 are driven by the first unit by means of a chain 48 trained about the sprockets 29 as shown in Fig. 1.

Figure 3:
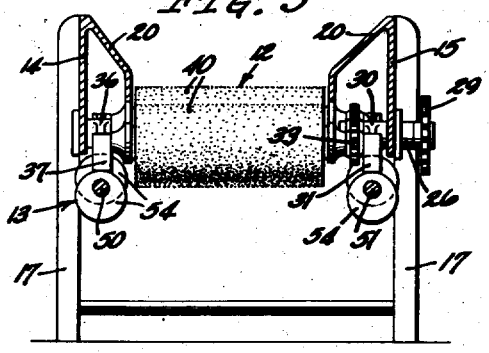
Fig. 3 is a vertical, transverse sectional view taken on the line 3—3 of Fig. 1.

The mechanism 13 for rocking the units 12 includes a pair of cam shafts 50 and 51 journalled in bearings 52 on the legs 16, 17 and 18. Fixed on the shafts 50 and 51 are cams 54 positioned to contact the lugs 31 and 37 of the bars 30 and 36 as shown in Figs. 1 and 3. Keyed on one end of each of the shafts 50 and 51 is a worm gear 60. Rotatably mounted in suitable bearings provided on the legs 16 is a shaft 61 having worms 62 thereon, the latter meshing with the worm gears 60 as shown in Fig. 2. The shaft 61 is driven from the motor M by a chain 64 trained about a sprocket 65 on the end of the shaft 61.

*Operation*

Figure 6:
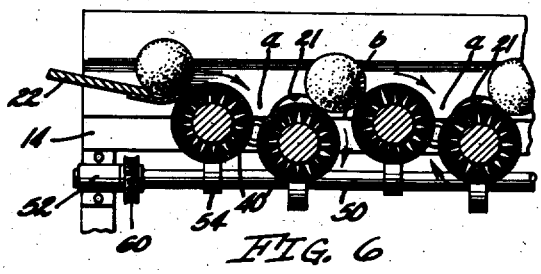

When the motor M is energized, the brushes 40 are all driven in a clockwise direction, as viewed in Fig. 1, through the medium of the chains 45 and 48. The cam shafts 50 and 51 are driven from the motor M by the chain 64, shaft 61 and gears 60 and 62. As the shafts 50 and 51 rotate, the cams 54 cause the units 12 to rock from the positions in which they are shown in Fig. 5 to those shown in Fig. 6, and back to the positions shown in Fig. 5, this rocking motion being continuous. Fruit to be brushed by the brushes 40 is fed onto the inlet board 22 and rolls into the first valley *a* when the units 12 are in the position in which they are shown in Fig. 5. As the units 12 rock to the position in which they are shown in Fig. 6, the fruit is carried by rotation of the brushes 40 from the primary valley *a* to the secondary valley *b*. As the brushes 40 continue to be raised and lowered by the rocking motion of the units 12, the fruit is progressively carried from valley to valley and eventually discharged onto the outlet board 23.

If an excess amount of fruit should be fed to the machine 10, the fruit is free to crowd through the machine 10 as fast as it will, it being clear that when the units 12 are inclined as shown in Fig. 5, the fruit in valleys *a* can easily be crowded into the valleys *b* by additional fruit before the units 12 are rocked to the position in which they are shown in Fig. 6.

After the feeding of fruit to the machine 10 is stopped upon completion of the brushing of a given lot of fruit, the rocking motion of the units 12 causes the residual fruit to be promptly cleaned out and the machine made ready to wash another lot of fruit.

Although I have shown and described but one preferred form of my invention, it is to be understood that many modifications and changes might be made therein without departing from the spirit of the invention or the scope of the following claims.

I claim as my invention:

1. In a fruit treating machine, the combination of: a frame; a plurality of juxtaposed rotary fruit treating elements journalled transversely on said frame, the uppermost sides of said elements forming a fruit treating surface characterized by fruit receiving valleys between each pair of said elements; means for driving each of said elements in a common direction of rotation; and means causing relative vertical movement between each adjacent pair of said elements, the fruit disposed in one of said valleys being caused to move into the next adjacent valley when the element forming one wall of said valley is disposed above the level of the element forming the advance wall of said valley.

2. In a fruit treating machine, the combination of: a frame; a plurality of juxtaposed rotary fruit treating elements journalled transversely on said frame, the uppermost sides of said elements forming a fruit treating surface characterized by fruit receiving valleys between each pair of said elements; means for driving each of said elements in a common direction of rotation; and means causing relative vertical movement between each adjacent pair of said elements, the fruit disposed in one of said valleys being caused to move into the next adjacent valley when the element forming one wall of said valley is lifted above the level of the element forming the advance wall of said valley.

3. In a fruit treating machine, the combination of: a frame; a plurality of juxtaposed rotary fruit treating elements journalled transversely on said frame, the uppermost sides of said elements forming a fruit treating surface characterized by fruit receiving valleys between each pair of said elements; means for driving each of said elements in a common direction of rotation; and means for raising and lowering each of said fruit treating elements, each alternate element being raised while the elements adjacent each side thereof are being lowered, the fruit disposed in each of said valleys being moved into the next adjacent valley when the elements forming the advance walls of said valleys are lowered in relation to the elements forming the other walls of said valleys.

4. In a fruit treating machine, the combination of: a frame; fruit inlet means at one end of said frame and fruit outlet means at the opposite end thereof; a pair of closely spaced cylindrical fruit treating elements journalled horizontally in transverse relation to said frame there being a fruit receiving valley formed between said elements, said elements comprising a fruit treating unit rockably mounted on said frame about an axis parallel with the longitudinal axes of said elements; means for rotating each of said elements so that the upper surfaces thereof travel in a direction toward the outlet end of said frame; and means for rocking said unit, said valley receiving fruit when said unit is inclined toward the inlet end of said frame and discharging said fruit when said unit is inclined toward the outlet end of said frame.

5. A combination as in claim 4 in which means is provided for maintaining a constant relationship between the speed of rotation of said fruit treating elements and the rate at which said fruit treating unit is rocked.

6. In a fruit treating machine, the combination of: a frame; fruit inlet means at one end of said frame and fruit outlet means at the opposite end thereof; a plurality of pairs of juxtaposed, cylindrical fruit treating elements disposed in transverse relation to said frame, each pair of said elements comprising a fruit treating unit rockably mounted about an axis parallel with the longitudinal axes of said elements, there being primary fruit receiving valleys formed on each of said units and secondary valleys formed between each of said units; means for rotating each of said elements in a common direction of rotation; and means for rocking each of said units; said primary valleys receiving fruit when said units are inclined toward the inlet end of said frame, said fruit being discharged from said primary valleys into said secondary valleys when said units are inclined toward the outlet end of said frame.

7. In a fruit washing machine, the combination of: a frame; a pair of cylindrical, juxtaposed brushes extending transversely of said frame; a gear on one end of each of said brushes; a driven shaft journalled in said frame and positioned centrally relative to said brushes; a gear on said shaft meshing with each of said gears on said brushes; means rockable about the axis of said driven shaft for rotatably supporting the ends of each of said brushes; and power means for actuating said rockable, brush supporting means.

8. In a fruit brushing machine, the combination of: a frame; a plurality of rotary brushes extending transversely of said frame and lying across the path of fruit through said machine; a pair of heads at opposite ends of said brushes, said brushes being rotatably mounted on said heads; means for pivotally mounting said heads on said frame on an axis parallel to and symmetrically but eccentrically disposed relative to said brushes; means for causing relatively rapid rotation of said brushes to brush fruit fed into temporary positions of rest on these; and means causing pivotal movement of said heads about said axis to cause said fruit to be discharged transversely of said brushes from said positions of rest.

9. In a fruit brushing machine, the combination of: a frame; a plurality of brushing units on said frame each of said units including a pair of heads, means for pivoting said heads on said frame on a given substantially horizontal axis, a plurality of rotary brush rollers mounted between said heads in symmetrical relation with said axis, said brushing units being disposed in substantially parallel relation in substantially the same plane; means for relatively rapidly rotating said brushes in each unit to brush fruit fed into temporary positions of rest on said brushes; and means causing pivotal movement of said units about said axes to cause each such unit to successively receive fruit from a position in said machine behind said unit and then discharge said fruit to a position in front of said unit, the fruit thus being forced to travel from unit to unit through said machine.

10. In a transverse brusher, the combination of: a series of transverse brushes disposed in substantially the same horizontal plane said brushes comprising two sets, each set including alternate brushes of said series; means for rotating the brushes of at least one of said sets; and means rocking the brushes of one set about axes lying substantially upon the peripheries of the brushes of the other set to cause progress longitudinally in said machine of fruit resting on said brushes.

11. In a transverse brusher, the combination of: a series of transverse brushes disposed in substantially the same horizontal plane said brushes comprising two sets, each set including alternate brushes of said series; means for rotating the brushes of at least one of said sets; means for rocking the brushes of one set about axes lying substantially upon the peripheries of the brushes of the other set to cause progress longitudinally in said machine of fruit resting on said brushes; longitudinal shaft means in said brusher; and cams provided on said shaft means and actuated thereby for accomplishing said relative vertical movement.

12. In a transverse brusher, the combination of: a brush bed for supporting, brushing and conveying a stream of fruit, said bed including two series of brushes disposed transversely to the direction of travel of fruit over said bed, and designated as the first series and the second series, the brushes of one series being interspersed alternately between the brushes of the other series; means for rotating the brushes of the first series; and means for rocking the brushes of the second series about axes lying substantially upon the peripheral paths of the outermost portions of the brushes of the first series to cause progress longitudinally through said machine of the fruit resting on said brushes.

HARRY J. BRANDENBURG.